United States Patent [19]

Billings et al.

[11] Patent Number: 4,882,636

[45] Date of Patent: Nov. 21, 1989

[54] HIGH SPEED CONTACT PRINTING PROCESS FOR PRERECORDED MAGNETIC TAPE

[75] Inventors: Wayne E. Billings, New Castle, Del.; Robert F. Phillips, Landenberg, Pa.; John E. Gantzhorn, Jr., Hockessin, Del.

[73] Assignee: Otari Electric Company, Ltd., Tokyo, Japan

[21] Appl. No.: 105,765

[22] Filed: Oct. 6, 1987

[51] Int. Cl.$^4$ .......................... G11B 5/86; G11B 5/008
[52] U.S. Cl. .......................................... 360/16; 360/17
[58] Field of Search ...................... 360/16, 17; 242/75, 242/201–203, 182, 187

[56] References Cited

U.S. PATENT DOCUMENTS

| | | | |
|---|---|---|---|
| 3,108,728 | 10/1963 | Selsted | 226/95 |
| 3,613,102 | 10/1971 | Daly et al. | 346/74 MT |
| 3,632,898 | 1/1972 | Slade et al. | 179/100.2 E |
| 3,761,645 | 9/1973 | Stancel, Jr. et al. | 179/100.2 E |
| 3,824,617 | 7/1974 | Kobayashi et al. | 360/16 |
| 3,825,948 | 7/1974 | Hendershot, III et al. | 360/16 |
| 3,928,747 | 12/1975 | Hanai et al. | 219/216 |
| 4,213,159 | 7/1980 | King | 360/16 |
| 4,631,602 | 12/1986 | Chouinard et al. | 360/16 |
| 4,698,700 | 10/1987 | Shirai | 360/16 |
| 4,698,701 | 10/1987 | Gantzhorn, Jr. et al. | 360/16 |
| 4,752,842 | 1/1988 | Odagiri | 360/17 |

FOREIGN PATENT DOCUMENTS 61-175931 8/1986 Japan.

OTHER PUBLICATIONS

Odagiri and Sato, High Speed Video Tape Duplication Using Contact Printing, *IEEE Transactions On Consumer Electronics*, vol. CE-30, No. 3, Aug. 1984.

Kihara, Odagiri and Sato, High Speed Video Tape Duplication Using *Contact Printing, IEEE International Conference on Consumer Electronics Digest of Technical Papers*, Ch 1872-1, Jun. 1983.

Cole, Bancroft, Chouinard and McCloud, Thermomagnetic Duplication of Chromium Dioxide Video Tape, *IEEE Transactions on Magnetics*, vol. MAG-20, No. 1, Jan. 1984.

Wierenga, Winsum and Linden, *Roughness and Recording Properties of Particulate Tapes: A Quantative Study*.

Hagopian, Thermomagnetic Transfer Mass Storage, *IBM Technical Disclosure Bulletin*, vol. 16, No. 12, May 1974.

*Primary Examiner*—Vincent P. Canney
*Attorney, Agent, or Firm*—Cushman, Darby & Cushman

[57] ABSTRACT

An improved contact printing process is disclosed whereby better contact is achieved between magnetic master and copy tapes through use of fluid pressure. Slippage between copy and master tapes is prevented by applying fluid pressure to the tapes in an area defined by the width of the tapes at the point where replication is initiated, and extending upstream along the length of the tapes prior to replication.

Slippage between copy and master tapes is prevented by applying fluid pressure to the tapes in an area defined by the width of the tapes at the point where replication is initiated, and extending upstream along the length of the tapes prior to replication.

6 Claims, 6 Drawing Sheets

HIGH SPEED CONTACT PRINTING PROCESS FOR PRERECORDED MAGNETIC TAPE

BACKGROUND OF INVENTION

1. Field of Invention

This invention relates to an improved high speed contact printing process for the duplication of information contained on a master tape onto a magnetic copy tape and, more particularly, to such a process wherein improved contact between the master and copy tapes is achieved through the application of fluid (typically air) pressure in accordance with the invention.

2. State of the Art

The prerecording of magnetic tapes generally may be accomplished in two ways. In the prevailing process, real time recording, a magnetic signal is read from a master recording and, after appropriate amplification and splitting, is recorded on the magnetic copy tape at the same speed that will be used in playing back the copy tape. This is substantially the same process that is used in home recording equipment, but up to one thousand recording machines are simultaneously operated from the signal generated by the master recording to bring the process to commercial scale. The logistics of providing, loading, unloading, operating and maintaining such a multitude of relatively complex equipment makes reproduction an expensive process.

In contact printing processes, in contrast, the copy tape is brought into physical contact with a master tape that bears the desired recording. The copy and master tapes are transported through a printing station where information contained on the master tape is duplicated onto the copy tape. The duplication technique may be anhysteretic, as generally described in High Speed Video Tape Duplication by Odagiri and Sato (IEEE Transactions, Aug., 1984), or thermomagnetic, as generally described by King in U.S. Pat.No. 4,213,159 and by Chouinard et al. in U.S. Pat.No. 4,631,602. In either case, copies are being made one-at-a-time and high speed duplication is essential if the process is to provide a practical alternative to the real-time technique generally used in preparing precorded video tapes.

As duplication speed increases, it becomes more difficult to maintain the precise registration and contact between the master and copy tapes that is needed for faithful duplication of the magnetic signal. Even microscopic slippage and/or separation between the tapes, which often occur simultaneously, will result in RF signal transfer deterioration, causing the copy tape to be of unacceptable quality.

Copending U.S. Pat.application Ser. No. 848,091, filed on Apr. 4, 1986, incorporated hereby by reference discloses a high speed thermomagnetic tape duplication process in which fluid pressure (typically compressed air) is employed to urge the master and copy tapes into close contact during the duplication step, and in which at least one of the tape surfaces that contacts the other has a specified roughness that facilitates the escape of air trapped between the two tapes as they are brought into contact. In this manner duplication speeds in excess of 2.5 meters/second may be obtained. However, it has been found that the master tape tends to become smooth in the course of thousands of recording cycles, due in part to buildup of lubricants driven from the copy tapes by heating, and RF signal transfer begins to deteriorate.

Japanese Patent Application 61-175931, published Aug. 7, 1986 discloses that tape slippage in an anhysteretic contact printing apparatus may be eliminated by providing an air jet and air collection channel with the channel extending at least from the jet toward the direction of tape travel (i.e., downstream). This approach was attempted in the process and equipment disclosed in the above-identified copending application, but there was no reduction in undesired tape slippage.

SUMMARY OF THE INVENTION

It now has been found that improved contact between master and copy tapes in the print station of a contact printing process is obtained if the air pressure used to achieve the contact is applied in a very specific fashion. More specifically, it has been found tape slippage is avoided if the air pressure is applied upstream of the point where replication is initiated. Applying the air pressure in the upstream direction only, rather than in both the upstream and downstream directions, minimizes the total force that bears on the tapes, thereby avoiding the need to employ a support system for the tapes that would be capable of withstanding the unnecessarily high force.

Accordingly, the present invention provides, in a high speed contact printing process for the replication of a magnetic image on a copy tape wherein the magnetic surface of the copy tape is brought into intimate contact with a master tape in a print station comprising a stationary pressure cap and a rotating tape support surface, the improvement wherein slippage between the copy and master tapes is prevented by applying fluid pressure to the tapes in the area defined by the width of the tapes at the point where replication is initiated, and extending upstream along the length of the tapes prior to replication, the length of said area exceeding its width, said fluid pressure being sufficient to cause air to evacuate from between said master and copy tapes. Tape replication speeds up to 4.5 meters per second have been successfully sustained, producing commercial quality prerecorded color video tape, using fluid pressure in the range of 3 to 6 kg/cm².

BRIEF DESCRIPTION OF THE DRAWINGS

This invention will now be described with reference to the attached figures in which similar numbers indicate similar parts, and in which.

DETAILED DESCRIPTION OF THE INVENTION

The invention will first be described in detail with reference to FIG. 1, which illustrates a preferred embodiment involving thermomagnetic duplication, although the invention has general utility in maintaining precise registration of master and copy tapes in other high speed contact printing applications. As used herein, the term "contact printing" means a process wherein the magnetic image contained on master magnetic tape is duplicated, or "replicated", on a copy tape while the master and copy tapes are in physical contact.

Figure 1:
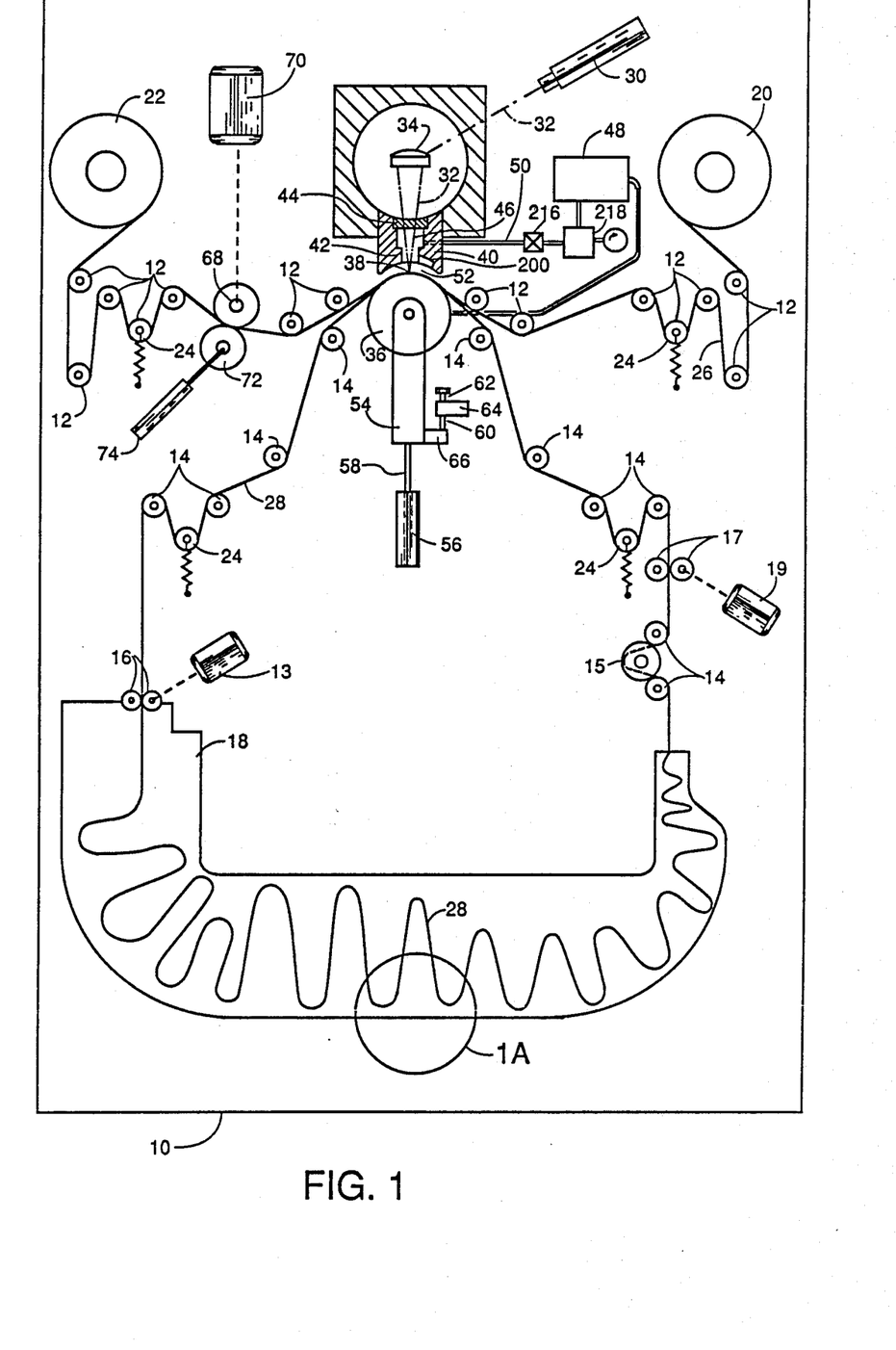
FIG. 1 is a schematic representation of a tape duplicating apparatus that may be used in practicing the invention.

Referring to FIG. 1, copy tape 26 is driven from a supply reel 20, through a print station, comprising air cap 40, print wheel 36, and laser beam 32, and is wound up on take-up reel 22. A master tape 28 is engaged with the traveling copy tape 26 in the print station and is further propelled into and out of a loop bin 18 by nip capstans 16 and 17 respectively. Copy tape tension is regulated on the entrance side of the print station by the drive for the supply reel 20 and the tension sensor roll 24. Master tape tension is regulated on the entrance side of the print station by nip capstan 17 and sensor roll 24, and is regulated on the exit side of the print station by nip capstan 16 and sensor roll 24. The copy tape tension on the exit side of the print station is determined by a balance of the aforementioned tape tensions and the frictional drag of the guide rollers 12 and 14 and the print wheel 36.

Figure 2:
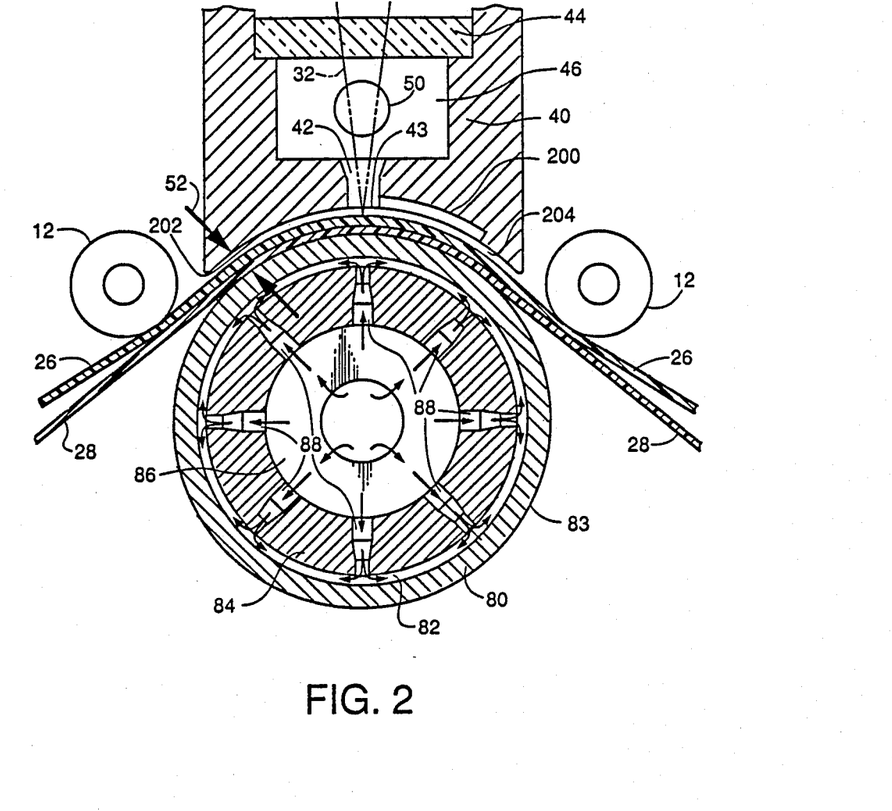
FIG. 2 shows a detailed elevation view, in section, of a contact printing station that may be used to advantage in practicing the invention.

As shown in FIGS. 1 and 2, a copy tape 26 is superimposed on a master tape 28 as they both are supported in their travel under air cap 40 by print wheel 36. The copy tape 26 is made to travel by nipping against a drive capstan 68. The master tape 28 is driven by the copy tape, since the master tape is frictionally engaged with the copy in a non-slipping manner under the air cap 40. The master is supported on a rotating cylindrical tape support, such as print wheel 36. The print wheel 36 is rotating at a circumferential speed equal to the tape traveling speed since it is driven by frictional engagement with the tapes. To minimize the resistance to rotation of the print wheel, it is supported for rotation by an air bearing comprised of flanged stationary hub 84 and print wheel ring 80. Air from a pressurized supply 48 is distributed from inlet 90 to air pressure equilization chamber 86, then via radial air nozzles 88 to air space 82 to float ring 80. Mounted above the print wheel 36 is a copying pressure applying means comprising air cap 40.

Figure 3:
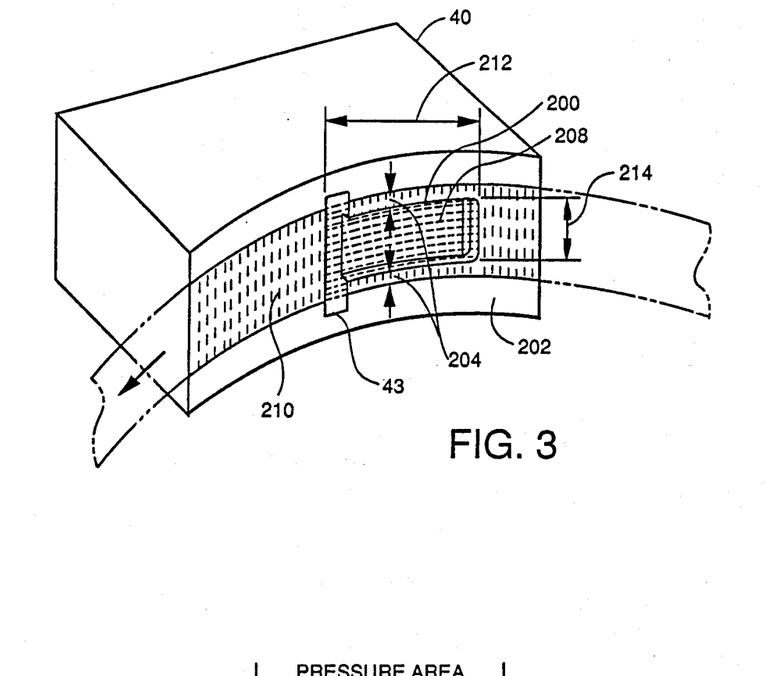
FIG. 3 is perspective view of an air cap designed and oriented for applying pressure in accordance with the invention.
Figure 5:
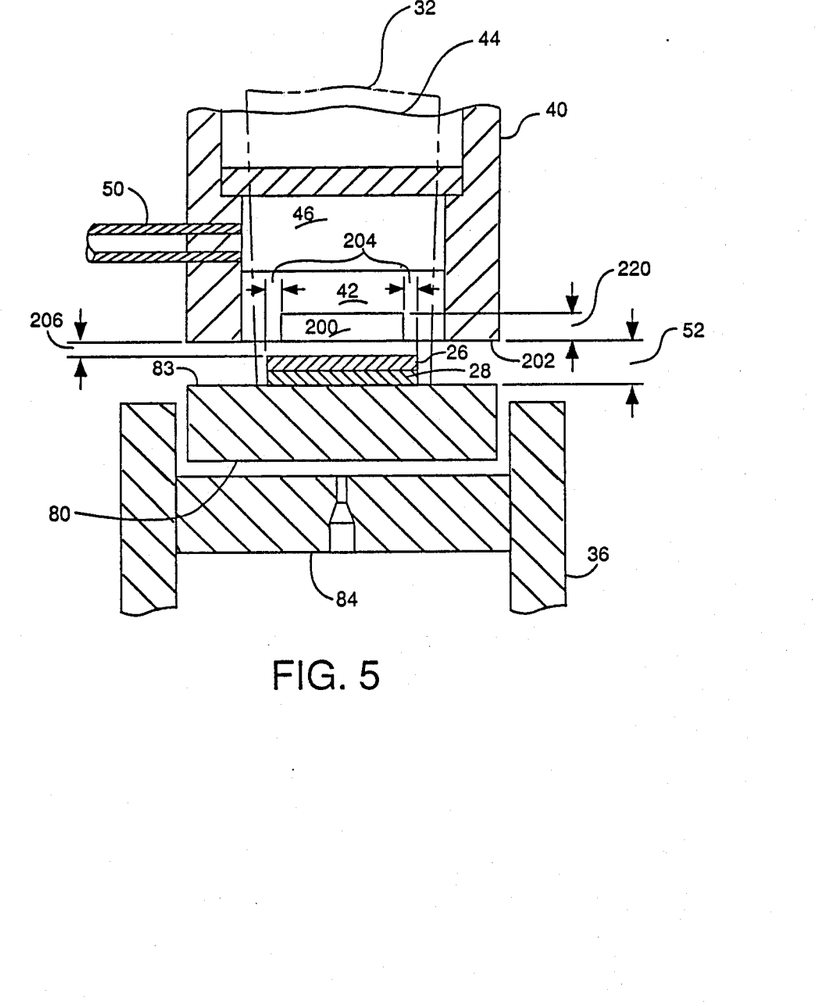
FIG. 5 shows a cross section of the print station pressure area.

As shown in greater detail in FIGS. 3 and 5, air cap 40 has an inner surface 202 that is cylindrical and coaxial with print wheel 36. Referring to FIGS. 2 and 5, inner surface 202 of the air cap and outer surface 83 of the print wheel define a narrow curvilinear space 52 through which the master and copy tapes are driven in intimate contact. When the tapes are passing through curvilinear space 52 the tapes define a clearance gap 206 between the backside of copy tape 26 and surface 202 of air cap 40. Air cap 40 has a pressure equalizing cavity 46 connected to the pressurized fluid supply, such as a source of compressed air 48, through conduit 50, on/off valve 216, and pressure regulator and gauge assembly 218. The upper end of cavity 46 is sealed by optically transparent window plate 44. The lower portion of the cavity leads to the atmosphere through gap 42, which terminates in exit channel 43, which communicates with gap 52 between the air cap and print wheel.

Laser 30 emits beam 32 that is focussed by lens 34, passes through the transparent window plate, and impinges on the copy tape as it passes under exit channel 43. The laser beam momentarily heats the copy tape magnetic layer above its Curie temperature; the magnetic image contained on the master tape is duplicated on the copy tape as it cools through its Curie point back to ambient temperature. When print wheel 36 is in its operating position, and both the master and copy tapes are threaded through the print station, an air leakage seal is formed between the air cap inner surface 202 and the backside of copy tape 26, along curvilinear clearance gap 206.

Figure 4:
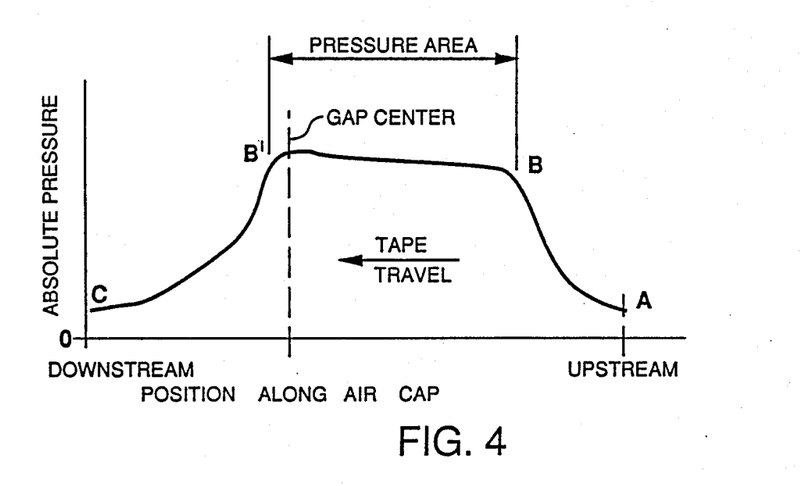
FIG. 4 is a schematic representation of the pressure profile the tapes are exposed to during transit through the print station.

Referring to FIGS. 3 and 4 and 5, the air cap has a chamber 200 on its curved inner surface, 202, that serves as a pressure distribution chamber. The chamber receives compressed air from exit channel 43 and directs the air against copy tape 26 as it approaches the position on the print wheel where the tape is heated by the laser beam. The width of chamber 200 is almost as wide as the width of the tapes 26 and 28 in order to promote intimate contact between the master and copy tapes in all regions containing the magnetic image, but generally the width will be such that a narrow band 204 of curvilinear clearance gap 206 exists between lateral edges of the chamber, and that of the tape, to act as a leakage seal to minimize air flow and pressure loss along the tape edge. Unrestricted air leakage tends to cause the tapes to flutter during the duplication process, adversely affecting quality of the copy tape and requires higher flow rates through conduit 50 to maintain high pressure on the tapes. Note that a pressure area 208 is defined on the tape as shown by the horizontal dashed lines in FIG. 3 and is determined by the projection onto the tape of the outline of the exit channel 43 and chamber 200. Surrounding the pressure area is leakage seal area 210 defined on the tape as shown by the vertical dashed lines. Area 210 shows the extend of curvilinear leakage seal gap 206 which is also depicted in FIG. 5 as the space between the copy tape 26 and air cap surface 202.

Some increased leakage from pressure area 208 can be tolerated, however, and occurs where slot 43 extends past the edge of the tapes in the FIG. 3 embodiment to provide clearance for the laser beam that spans the entire width of the tapes in the region where the copy tape is heated by the laser, which is focussed on the tape through the slot. Leakage here, however, is still somewhat limited by the curvilinear space 52 between the air cap surface 202 and surface 83 on print wheel ring 80. However, when elimination of edge seals 204 was tried by enlarging the width of chamber 200 to equal that of exit channel 43 and extending its depth to intersect pressure equalizing cavity 46, problems occurred. Eliminating these seal resulted in excess leakage that necessitated high air flows to maintain the pressure, causing excess noise and occasional tape flutter.

It has been found that the preferred air cap design ensures good tape contact prior to and during initiation of replication. Thus duplication of magnetic signals is achieved across the entire width of the copy tape.

FIG. 5 shows a preferred embodiment for achieving a pressure area prior to and during initiation of replication, by applying fluid pressure via gap 42 and exit channel 43. The periphery of pressure area 208 is sealed in this embodiment by curvilinear clearance gap 206 projected on the tape as seal area 210. This sealing clearance gap should be kept as small as possible while insuring that the moving tapes never contact the surface of the air cap. It has been found that gaps less than the combined thicknesses of the tapes typically used for video duplication works well. For instance, a clearance gap of 0.025 mm has been found to work very well. Other variations for achieving a workable pressure area and seal are possible. For instance, chamber 200 could extend through air cap 40 until it intersected pressure equalizing cavity 46. Some variations in sealing by altering the air cap and print wheel ring surfaces are shown in FIGS. 6 and 7.

Figure 6:
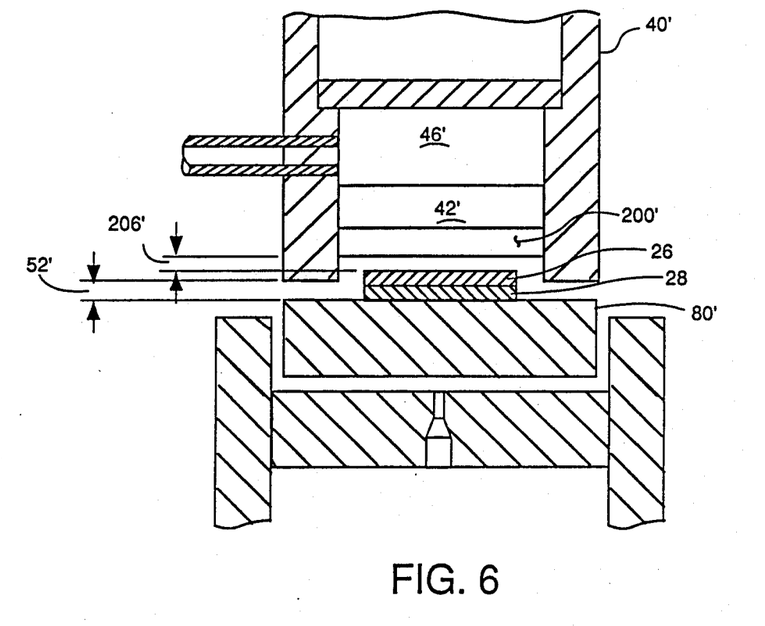
FIG. 6 shows a partial cross section of one alternate embodiment for sealing the pressure area.
Figure 7:
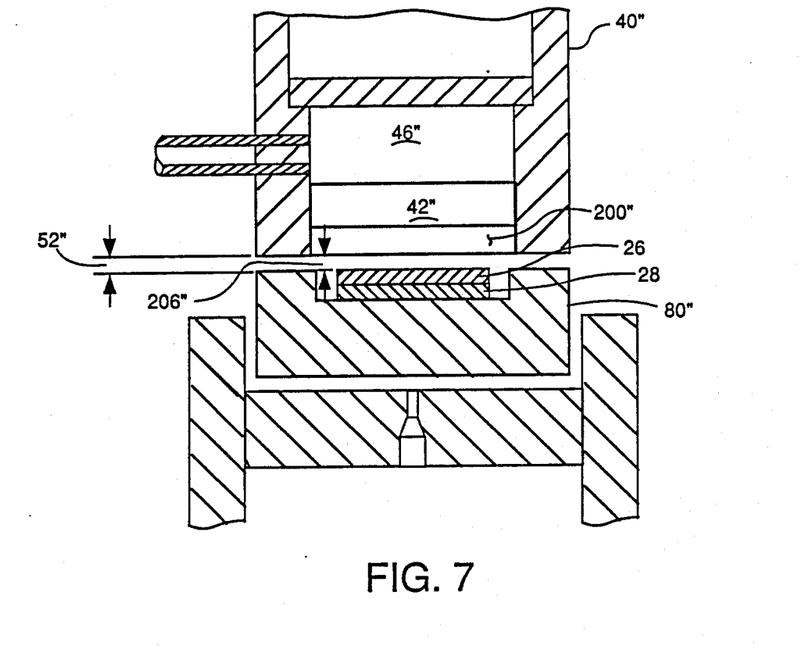
FIG. 7 shows a partial cross section of another alternate embodiment for sealing the pressure area.

In FIG. 6, the width of the chamber 200 extends past the width of tapes 26 and 28. Sealing around the pressure area is achieved by providing a groove in the surface of air cap 40' that receives tapes 26 and 28. This produces a curvilinear space 52' that is equal to curvilinear clearance gap 206' to form a leakage seal. Alternatively, in FIG. 7, a groove could be provided in the surface of print wheel ring 80" that receives tapes 26 and 28. In this case, curvilinear space 52" between the air cap surface and the print wheel ring is again equal to curvilinear clearance gap 206" between the air cap surface and the backside of the outermost tape.

Referring to the embodiment of FIGS. 3 and 5, the depth 210 of the chamber 200 can be so large as to intersect pressure equalizing cavity 46 or it can be a shallow chamber as shown. When a shallow chamber is used it should be deep enough to allow the pressure to be evenly distributed over the area. As a rule, the depth should be greater than the sealing clearance gap 206 that inhibits pressure distribution, and preferably an order of magnitude greater. A depth of about 0.25 mm has been found to work well when the sealing clearance gap 206 is about 0.025 mm. A corresponding curvilinear space 52 is about 0.076 mm when the combined tape thickness including a lap splice in the endless master tape is about 0.051 mm. The pressure area should be located beginning where the replication is initiated, such as at exit channel 43 and should extend upstream to apply pressure to the moving tapes before they reach the point where replication is initiated. This serves to give the pressure time to squeeze entrapped air from between the tapes before replication. After the air is squeezed out, a much reduced pressure can maintain intimate contact between the tapes. It is important to keep the total force on the tapes reduced to keep the load requirements of the print wheel bearings low. This permits use of a lower capacity print wheel which in the case of an air bearing supported print wheel means a lower pressure and flow rate air source can be used which may affect operating costs as well as hardware costs.

To minimize total force on the tapes and still achieve good copying, the length 212 of the pressure area should only extend upstream. It has been found, however, that this length should extend for a distance related to the width of the tapes, since the air being squeezed out must travel further for wider tapes. It has been found that a length greater than the width of the tapes works well. For instance, for 12.7 mm wide tapes, pressure area lengths of 14.22 mm and 20.57 mm were tried with the same pressure area width of 10.16 mm. Both pressure areas continued to operate without tape handling problems for the same number of passes of the master tape, but when signal rf was measured after about 2500 passes, the 14.22 mm long area was producing copies having an rf level that was only marginally acceptable. The 20.57 mm long area was producing copies that had an rf level twice as high as the 14.22 mm long area. The rf signal variation of the 14.22 mm long area was also about 50% greater than the 20.57 mm long area. The width 214 of the pressure area should also not be too narrow compared to the tape width. For instance, for the same 12.7 mm tapes an area width of 7.62 mm and 20.57 mm length did not perform well after about 400 passes.

FIG. 4 illustrates a typical pressure profile that exists when using the air cap described in FIG. 3. As the copy tape passes the upstream edge of the air cap it experiences a steady increase in pressure from atmospheric at a to B. Pressure experienced by the tape increases to B at the upstream edge of chamber 200. Pressure may increase slightly to B' as the tape is transported past the exit channel 43 where it is heated by the laser. Pressure experienced by the tape then drops steadily past the downstream edge of the exit channel, and back to atmospheric pressure at C at the downstream edge of the air cap.

The pressure profile illustrated in FIG. 4 encourages the escape of entrapped air before replication since the tape experiences an increased pressure for a significant time even at high speeds prior to the point of heating. After heating, the copy tape cools through its Curie temperature very rapidly before leaving the air cap. Intimate contact is easily maintained between the master and copy tapes, without slippage, since entrapped air has been squeezed from between the tapes earlier in the process. That is, the master and copy tapes remain in precise registration during replication of the master magnetic image on the copy tape magnetic layer.

The air pressure that is selected in practicing the invention will depend in part on smoothness of the master and copy tapes, desired transport speed of the tapes, available air pressure, and design of the specific air cap and print wheel bearing. Generally speaking, higher pressures are necessary when smoother tapes are selected, or as speed of the tapes through the contact printing process increases. It also will be appreciated that higher pressures will be required if the device applying the pressure to the tapes is inefficient because, for example, there is not a close seal between the copy tape and the device, allowing rapid escape of the pressurized air.

Excellent results have been obtained employing an air pressure distribution chamber pressure of approximately 3 to 6 kg/cm$^2$ with the process illustrated in FIGS. 1 through 5. The process has been conducted continuously for thousands of copy cycles at speeds up to approximately 4.5 m/sec. producing high quality prerecorded color video tapes. This corresponds to reproduction of a 2 hour movie in less than 1 minute.

While the invention has been described with respect to a particular process it will be appreciated that the improvement provided by this invention may be used with other contact printing processes, such as anhysteretic tape replication.

EXAMPLE

A. To further illustrate the invention, copy tape and master tape described in copending U.S. Pat.application Ser. No. 848,091, filed Apr. 4, 1986, incorporated herein by reference, were used with equipment described in FIGS. 1 through 3, except that the air cap was not equipped with air pressure distribution chamber 200. Chamber air pressure was approximately 3.5 kg/cm$^2$. The color video signal, copied at a speed of 4.5 meters/- second, degraded after approximately 350 passes of the master tape had been made to produce unacceptable quality copies. Lubricant from the copy tape had built-up on the master tape, filling the surface irregularities in the master tape that had allowed escape of entrapped air from between the tapes during early copy cycles.

B. An air cap illustrated in FIG. 3 was substituted for the air cap used in A, but was installed such that the pressure distribution chamber 200 was oriented on the downstream side of slot 43, rather than on the upstream side as shown, as taught in Japanese unexamined Pat.No. 61-175931. This cap was substituted after copy degradation had occurred in operation of the equipment provided with an air cap not having pressure distribution chamber 200, as described in A. Copy quality was not restored, and remained unacceptable.

C. The air cap used in B was then reoriented as illustrated in FIG. 3 and was operated according to this invention. Tape tension was stabilized, and copy quality was restored using the same master as in A and B. Acceptable quality was maintained for an additional 1300 passes of the master tape through the copy cycle, at which time the test was stopped. Quality of the last copy, made after more than 1600 passes of the master, was still acceptable. Measurement of the static friction of the master tape indicated that extensive residue has built up on the master tape. Yet, the air cap built and oriented in accordance with the invention permitted many more copies to be made than was previously possible in spite of the residue buildup. By applying pressure only where replication was initiated and on the upstream area of the tapes, the existing print station air bearing capacity was not exceeded and a higher capacity air bearing was not required.

We claim:

1. In a high speed contact printing process for the replication of a magnetic image on a copy tape wherein the magnetic surface of the copy is brought into intimate contact with a master tape in a print station comprising a stationary pressure cap and a rotating tape support surface, the improvement wherein slippage between the copy and master tapes is prevented by applying fluid pressure to the tapes in the area defined by the width of the tapes at the point where replication is initiated, and extending upstream along the length of the tapes, and not downstream of said point, the length of said area exceeding its width, said fluid pressure being sufficient to cause air to evacuate from between said master and copy tapes.

2. The process of claim 1 wherein the fluid is compressed air.

3. The process of claim 2 wherein the air pressure is approximately 3 to 6 kg/cm$^2$.

4. In a thermomagnetic duplication process wherein a master tape and a copy tape are brought into contact, the copy tape is heated above its Curie temperature and then cooled through its Curie temperature while contact is maintained between the master and copy tapes, the improvement wherein slippage between the copy and master tapes is prevented by applying fluid pressure to the tapes in the area defined by the width of the tapes at the point where replication is initiated, and extending upstream along the length of the tapes, and not downstream of said point, the length of said area exceeding its width, said fluid pressure being sufficient to cause air to evacuate from between said master and copy tapes.

5. The process of claim 4 wherein the fluid is compressed air.

6. The process of claim 5 wherein the air pressure is approximately 3 to 6 kg/cm$^2$.

* * * * *